United States Patent
Utsugi et al.

(10) Patent No.: US 7,163,768 B2
(45) Date of Patent: Jan. 16, 2007

(54) ELECTROLYTE SOLUTION FOR SECONDARY BATTERY AND SECONDARY BATTERY USING THE SAME

(75) Inventors: Koji Utsugi, Tokyo (JP); Yuki Kusachi, Tokyo (JP); Ikiko Yamazaki, Tokyo (JP)

(73) Assignee: NEC Corporation, Tokyo (JP)

( * ) Notice: Subject to any disclaimer, the term of this patent is extended or adjusted under 35 U.S.C. 154(b) by 598 days.

(21) Appl. No.: 10/647,541

(22) Filed: Aug. 26, 2003

(65) Prior Publication Data

US 2004/0043300 A1    Mar. 4, 2004

(30) Foreign Application Priority Data

Aug. 29, 2002  (JP)  ............................. 2002-250441
Feb. 28, 2003  (JP)  ............................. 2003-052588
Aug. 7, 2003   (JP)  ............................. 2003-289432

(51) Int. Cl.
    *H01M 6/16*    (2006.01)
(52) U.S. Cl. ................. 429/340; 429/329; 429/330; 429/199; 429/231.1; 429/231.95; 429/231.4; 429/231.8; 252/62.2
(58) Field of Classification Search ............... 429/340, 429/329, 330, 199, 231.1, 231.95, 231.4, 429/231.8; 252/62.2
See application file for complete search history.

(56) References Cited

U.S. PATENT DOCUMENTS

| 4,528,254 | A | 7/1985 | Wolf et al. |
| 6,033,809 | A | 3/2000 | Hamamoto et al. |

FOREIGN PATENT DOCUMENTS

| JP | 5-44946 | 7/1993 |
| JP | 5-234583 | 9/1993 |
| JP | 5-275077 | 10/1993 |
| JP | 7-302617 | 11/1995 |
| JP | 8-250108 | 9/1996 |
| JP | 8-268998 | 10/1996 |
| JP | 11-288706 | 10/1999 |
| JP | 11-339850 | 12/1999 |
| JP | 2000-3724 | 1/2000 |
| JP | 2000-123868 | 4/2000 |
| JP | 2001-68154 | 3/2001 |
| JP | 2001-313071 | 11/2001 |
| JP | 2002-83632 | 3/2002 |
| WO | WO 85/03075 | 7/1985 |

OTHER PUBLICATIONS

NAOI et al., "Disclose in the 68th Annual Meeting of the Electrochemical Society of Japan", *Chiba Institute of Technology*, Sep. 2000, Number of presentation; 2A23-2A24, p. 24. (Not in English).
The 41st Battery Symposium in Japan, *Nagoya International Conference Hall*, Nov. 2000, Number of presentation; 1E03, pp. 524-525. (Not in English).
European Search Report dated Jan. 13, 2004.
Shirakata, Masato, et al., "Secondary Lithium Ion Batteries", Data Accession No. 132:13892, XP002265678. (JP 11-339850).
Japanese Office Action dated Apr. 4, 2006, with partial English-Language translation.

*Primary Examiner*—Laura Weiner
(74) *Attorney, Agent, or Firm*—McGinn IP Law Group, PLLC

(57) ABSTRACT

The present invention provides a technology of inhibiting the decomposition of the solvent of the electrolyte solution for the secondary battery. Further, the present invention provides a technology of prohibiting the resistance increase of the secondary battery and improving the storage properties such as improving the capacity retention ratio. The electrolyte solution 15 comprising non-proton solvent and cyclic sulfonic ester including at least two sulfonyl groups may be used.

29 Claims, 2 Drawing Sheets

ELECTROLYTE SOLUTION FOR SECONDARY BATTERY AND SECONDARY BATTERY USING THE SAME

BACKGROUND OF THE INVENTION

1. Field of the Invention

The present invention relates to an electrolyte solution for a secondary battery and a secondary battery using the electrolyte solution.

2. Description of the Related Art

A non-aqueous electrolyte lithium ion secondary battery or a non-aqueous electrolyte lithium secondary battery having an anode made of a carbon material, an oxide, a lithium alloy or metallic lithium is attracting attentions as electric power sources for cell phones or notebook computers, since the use of such battery provides higher energy density.

It is known that a film, which is referred to as surface film, protection film, solid electrolyte interface (SEI) or coating layer (hereinafter generically referred to as surface film), is formed on the surface of the anode of such type of the secondary battery. Since the surface film affects the efficiency of electrical charging and discharging, the cycle life and the safety of the secondary battery, it is known that the controlling the formation of the surface film is essential for achieving higher performances of the anode. When the carbon materials or the oxides are employed for the anode, the irreversible capacity of these materials must be reduced. When the metallic lithium anode or the lithium alloy anode is employed, the problems of lower efficiency of electrical charging and discharging or the problems of lower safety due to the formation of the dendrite crystal (tree branch-shaped crystal) must be solved.

Various methods have been proposed for the purpose of solving these problems. For example, it was proposed that the formation of the dendrite can be inhibited by forming a coating layer comprising lithium fluoride or the like on the metallic lithium substrate or the lithium alloy surface via the chemical reaction.

In JP-A-H7-302,617 is disclosed a technique of coating the surface of the lithium anode with the lithium fluoride film by exposing the lithium anode to an electrolyte solution containing hydrofluoric acid thereby reacting the anode surface with hydrofluoric acid. Hydrofluoric acid is generated by a reaction between $LiPF_6$ and a slight amount of water. Meanwhile, a surface film of native lithium hydroxide or native lithium oxide is formed on the lithium anode surface via natural oxidation in the atmospheric condition. The surface film of the lithium fluoride, in turn, is formed on the anode surface by reacting the native oxide or hydroxide film and the hydrofluoric acid. However, since the lithium fluoride film is obtainable via the reaction between the anode interface and the solution, it is difficult to obtain uniform lithium fluoride film, as the surface film is easily contaminated with the reaction byproducts generated during the reaction. Further, when the surface film of native lithium hydroxide or native lithium oxide is not uniformly formed, the surface film may partially include bare lithium surfaces. In such case, uniform thin film of lithium fluoride is not obtainable, and further serious safety problems of possibly reacting the bare lithium surface with water or hydrogen fluoride may be caused. In addition, when the reaction is insufficient and not completed, unwanted other products than fluorides may remain in the surface film, thereby possibly causing harmful effects such as deterioration of ion conductivity. In addition, in the method of forming the fluoride layer by employing the chemical reaction occurred on the interface, the availability of fluorides and electrolyte solutions is strictly limited, thereby making it difficult to form the stable surface film with higher process yield.

In JP-A-H8-250,108 is disclosed a technique of forming a surface film of lithium fluoride on the anode surface by causing a reaction between a gaseous mixture of argon and hydrogen fluoride and an aluminum-lithium alloy. However, when a surface film of other material, in particular a surface film of a plurality of chemical compounds, already exists on the metallic lithium surface before forming the surface film of lithium fluoride thereon, reaction tends to proceeds non-uniformly, so that it is difficult to form a uniform film of lithium fluoride. In this reason, it is difficult to obtain a lithium secondary battery having sufficient cycle properties.

In JP-A-H11-288,706 is disclosed a technique of forming a surface coating structure comprising a material having rock-salt structure as a main component on a surface of a lithium sheet having an uniform crystal structure, i.e., [100] crystalline plane is preferentially oriented. It is also disclosed that this technique provides uniform deposition-dissolution reaction thereof, that is, uniform charging and discharging of the battery, so that the dendrite deposition is inhibited to improve the cycle life of the battery. It is further disclosed that the materials for the surface film preferably include halides of lithium, and more preferably include a solid solution of LiF and at least one selected from the group consisting of LiCl, LiBr and LiI. More specifically, an anode for non-aqueous electrolyte battery is manufactured by dipping a lithium sheet having preferentially oriented [100] crystalline plane and being manufactured via a metal pressuring (flat rolling) process into an electrolyte solution containing fluorine molecule or fluorine ion and at least one selected from the group consisting chlorine molecule or chlorine ion, bromine molecule or bromine ion and iodine molecule or iodine ion, in order to form the solid solution coating of LiF and at least one selected from the group consisting of LiCl, LiBr and LiI. This technique cannot sufficiently prevent the formation of the dendrite deposition, since the lithium sheet used in this technique is manufactured via flat rolling process, in which the lithium sheet may be exposed to the air atmosphere so that the native surface coatings derived by moisture and the like may easily be formed partially on the surface of the lithium sheet during the process, thereby non-uniformly distributing the active areas across the surface of the sheet, and being difficult to form the targeted stable surface film.

Further, NAOI et al. disclose in the 68th Annual Meeting of The Electrochemical Society of Japan (September 2000, at CHIBA INSTITUTE OF TECHNOLOGY, Number of presentation; 2A24), and The 41st Battery Symposium in Japan (November 2000, at NAGOYA INTERNATIONAL CONFERENCE HALL, Number of presentation; 1E03) that the influence of the complex of lanthanoid transition metals such as europium or the like and imide anion to the metallic lithium anode. It was presented in these presentation that an electrolyte solution is prepared by dissolving a lithium salt of $LiN(C_2F_5SO_2)_2$ into a mixed solvent of propylene carbonate or ethylene carbonate and 1,2-diethoxymethane, and further adding an additive of $Eu(CF_3SO_3)_3$, and the surface film of $Eu[(C_2F_5SO_2)_2]_2$ complex is formed on the Li metal surface that is dipped in this electrolyte solution. This method is effective in improving the cycle life in a certain level, but not sufficient. In addition, this method requires relatively expensive lithium imide salt such as $LiN(C_2F_5SO_2)_2$. Other Lithium imide salt cannot be employed for this method, since the complex of transition metal and imide anion is not formed when adding the complex of other lithium salt (e.g., typically $LiPF_6$) transition metal and $CF_3SO_3^-F_3S$ ion, and thus the cycle properties can not be improved. Further, the use of lithium imide salts as the electrolyte solution provides higher resistance of the electrolyte solution than the use of $LiPF_6$ and the like, thereby causing a problem of increasing the internal resistance of the battery.

Further, it was reported that the use of carbon materials such as graphite or amorphous carbon that is capable of storing and emitting lithium ion for the anode improves the electrical capacity and the efficiency of charging and discharging.

In JP-A-H5-234,583, an anode comprising a carbon material that is coated with aluminum is proposed. This configuration inhibits reductional decomposition of solvent molecular that solvates with lithium ion, so that the degradation of the cycle life can be prevented. However, in this method, aluminum reacts with a slight amount of water, thereby causing a problem of rapidly decreasing the electrical capacity of the battery when cycles are repeated.

In JP-A-H5-275,077, an anode comprising a carbon material, a surface of which is coated with a thin film of lithium ion-conductive solid electrolyte. This configuration inhibits decomposition of the solvent that is occurred due to the use of the carbon material, and in particular, this configuration can provide a lithium ion secondary battery that is capable of using propylene carbonate. However, cracks are generated in the solid electrolyte due to the stress variation when lithium ion is inserted and desorbed, and the cracks lead to the deterioration of the properties thereof. Further, the quality of the solid electrolyte is not uniform due to the crystalline defects contained therein, and the non-uniformity of the quality leads to non-uniform reaction across the surface of the anode, thereby deteriorating the cycle life.

In JP-A-2000-3,724 is disclosed a secondary battery comprising: an anode comprising a material including graphite; an electrolyte solution containing a main component of cyclic carbonate and linear carbonate, and the electrolyte solution additionally containing 0.1% wt. to 4% wt. of 1,3-propanesultone and/or 1,4-butanesultone. It is considered that since 1,3-propanesultone and 1,4-propanesultone contribute the formation of the passivating coating on the carbon material surface, the active and highly crystallized carbon material such as natural graphite or artificial graphite is coated with this type of passivating coating to provide an advantageous effect of inhibiting the degradation of the electrolyte solution without deteriorating the ordinal chemical reaction for the battery. However, this method does not provide sufficient coating effect, such that the electrical charge generated by decomposition of solvent molecule or anion appears as an irreversible electrical capacity component, thereby decreasing the initial charge-discharge efficiency. Further, the resistance of thus formed coating is high, and in particular, the rate of the increase of the resistance with time or during storing in high temperature is considerably large.

As described above, the techniques disclosed in the prior art documents cannot provide sufficient improvement in the battery properties, and in particular, cannot provide sufficient effect on improving the charge-discharge efficiency and on preventing the increase of the resistance during storing. Thus, the following problems arise in the prior art.

The surface film formed on the anode surface closely relates to charge-discharge efficiency, cycle life and/or safety in relation to the characteristics of the film. However, there is no established method of continuously controlling the characteristics of the surface film in longer term. For example, when a surface film of lithium halides or amorphous or vitreous oxides is formed on a layer of lithium or alloys thereof, some effect of inhibiting the dendrite deposition appears in a certain level only in the initial operation. However, in the repeated operation, the surface film becomes degraded and the function of the protective film is impaired. It is considered that the reason of the degradation is the generation of the internal stress in these layers and on the interfaces therebetween, since the volume of the layers comprising lithium and lithium alloy varies due to the absorption and the emission of lithium, and on the contrary the volume of the coating thereon comprising lithium halides and so on does not substantially varies. The generation of the internal stress causes the breakage in a part of the surface film of, in particular lithium halides, thereby deteriorating the function of inhibiting dendrite growth.

Further, in relation to the carbon materials such as graphite, the surface coating cannot provide sufficient coating effect, the electrical charge generated by the decomposition of solvent molecule or anion appears as an irreversible electrical capacity component, thereby decreasing the initial charge-discharge efficiency. The compositions, crystalline condition, stability and so on of the formed film are considerably influential in the efficiency, the cycle life, the resistance and the increase of the resistance of the resultant battery. Further, a slight amount of moisture contained in the graphite or amorphous carbon anode promotes the decomposition of the solvent of the electrolyte solution. Thus, the elimination of the water molecule should also be carried out when the graphite or amorphous carbon anode is employed.

As described above, the coating formed on the anode surface closely relates to charge-discharge efficiency, cycle life and/or safety in relation to the characteristics of the film. However, there is no established method of continuously controlling the characteristics of the surface film in longer term, and it has been desired to develop an electrolyte solution, which is stable with the material of the anode and contributes to the sufficient charge-discharge efficiency.

In view of the above situation, it is an object of the present invention to provide a technology for inhibiting the decomposition of the solvent contained in the electrolyte solution for the secondary battery. It is also another object of the present invention to provide a technology for improving the cycle life of the secondary battery. It is yet another object of the present invention to provide a technology of improving the storing characteristics thereof such as the inhibition of the increase of the resistance of the secondary battery, retention rate of the electrical capacity of the secondary battery and so on.

SUMMARY OF THE INVENTION

According to the present invention, there is provided an electrolyte solution for the secondary battery comprising non-proton solvent and cyclic sulfonic ester including at least two sulfonyl groups.

The electrolyte solution for the secondary battery according to the present invention includes cyclic sulfonic ester including at least two sulfonyl groups. Such cyclic sulfonic ester contributes the formation of the passivation coating at an electrode interface of the battery, resulting that the decomposition of solvent molecules is prohibited. Also, when the cathode is made of an oxide including manganese, the configuration of the present invention provides preventing the elution of the manganese and further preventing the adhesion of the eluted manganese onto the anode. Thus, the electrolyte solution for the secondary battery according to the present invention can be employed for the secondary battery to form the coating on the anode, providing the advantageous effects such as the effect of decreasing the influence against the elution of the manganese or the like, and therefore, the cycle properties of the secondary battery according to the present invention can be improved by the advantageous effects. In addition, the increase of the resistance of the secondary battery can also be prohibited.

In the electrolyte solution for the secondary battery according to the present invention the aforementioned cyclic sulfonic ester may be a compound represented by a general formula (1) described below:

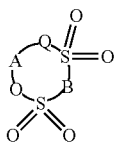

(where: Q is oxygen atom, methylene group or single bond; A is substituted or non-substituted alkylene group containing 1 to 5 carbons, carbonyl group, sulfinyl group, substituted or non-substituted fluoroalkylene group containing 1 to 6 carbons or divalent group containing 2 to 6 carbons being bonded to alkylene unit or fluoroalkylene unit via ether bond; and B is substituted or non-substituted alkylene group, substituted or non-substituted fluoroalkylene group or oxygen atom.)

The electrolyte solution for the secondary battery according to the present invention contains the compound shown in the general formula (1). The compound shown in the general formula (1) contributes the formation of the passivation coating at an electrode interface of the battery, resulting that the decomposition of solvent molecules is prohibited. Also, when the cathode is made of an oxide including manganese, the configuration of the present invention provides preventing the elution of the manganese and further preventing the adhesion of the eluted manganese onto the anode. Thus, the electrolyte solution for the secondary battery according to the present invention can be employed for the secondary battery to form the coating on the anode, providing the advantageous effects such as the effect of decreasing the influence against the elution of the manganese or the like, and therefore, the cycle life of the secondary battery according to the present invention can be improved by the advantageous effects, and the increase of the resistance of the secondary battery can also be prohibited.

In the above-shown general formula (1), when Q is single bond, the chemical structure thereof is that carbon atom contained in A and S (sulfur) constitute C—S single bond.

Further, in the above-shown general formula (1), the number of carbon atoms indicates the number of carbons constituting the loop and not including the number of carbons disposed in the branches. When A is substituted or non-substituted fluoroalkylene group containing 1 to 6 carbons, A may comprises methylene unit and fluoromethylene unit, or may only fluoromethylene unit. When A is bonded to alkylene unit or fluoroalkylene unit via ether bond, alkylene units may be mutually bonded, fluoroalkylene unit may be mutually bonded, or alkylene unit and fluoroalkylene unit may be bonded.

The electrolyte solution for the secondary battery according to the present invention may contains imide anion and transition metal ion. This configuration provides forming metal complex of imide anion and transition metal ion on the anode surface. Alternatively, metal complex of imide anion and transition metal ion may be added to the electrolyte solution of the present invention. In this configuration, the added metal complex itself or a reactant thereof is formed on the electrode surface. The formation of the coating on the surface can improve the cycle properties of the battery and prohibit the gas emission and the increase of the resistance.

According to the present invention, there is also provided a secondary battery comprising at least cathode and anode, and the secondary battery further comprises the aforementioned electrolyte solution for the secondary battery. Since the secondary battery according to the present invention contains the electrolyte solution for the secondary battery containing the compound having the above-shown general formula (1) as the electrolyte solution, the configuration provides the improvements in the battery properties such as the cycle properties or the rate of the increase of resistance.

According to the present invention, the secondary battery may also be a film packaging-secondary battery comprising a packaging of a film. This configuration provides prohibiting the increase of resistance of the battery. The configuration also provides prohibiting the gas emission from the battery and the expansion of the battery.

Here, the electrolyte solution for the secondary battery according to the present invention is simply and stably manufactured by a manufacturing method comprising steps of: dissolving the compound having the above-shown general formula (1) into a solvent; and dissolving lithium salt therein.

DETAILED DESCRIPTION OF THE PREFERRED EMBODIMENTS

Figure 1:
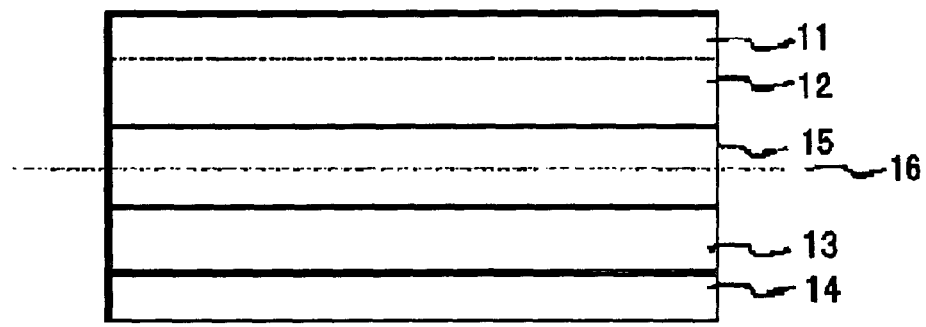
FIG. 1 is a schematic sectional view showing an example of the constitution of the anode collector of the secondary battery of an example according to the present invention.

The specific constitutions according to the present invention will be described below in detail by referring to the attached drawings. The battery according to the present invention comprises a constitution of, for example, FIG. 1. FIG. 1 is a schematic enlarged cross sectional view of an anode collector of the secondary battery, the view being enlarged along the thickness direction. A cathode is formed by depositing a layer 12 comprising a cathode active material on a cathode collector 11. An anode is formed by depositing a layer 13 comprising an anode active material on an anode collector 14. The cathode and the anode are disposed in an opposed relationship, between which an electrolyte solution 15 and a porous separator 16 located in the electrolyte solution 15 are disposed. The porous separator 16 is disposed to be generally parallel to the layer 13 comprising the anode active material.

The electrolyte solution 15 contains non-proton solvent and cyclic sulfonic ester including at least two sulfonyl groups.

Cyclic sulfonic ester including at least two sulfonyl groups may be a compound represented by the following general formula (1):

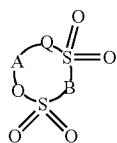

(where: Q is oxygen atom, methylene group or single bond; A is substituted or non-substituted alkylene group containing 1 to 5 carbons, carbonyl group, sulfinyl group, substituted or non-substituted fluoroalkylene group containing 1 to 6 carbons or divalent group containing 2 to 6 carbons being bonded to alkylene unit or fluoroalkylene unit via ether bond; and B is substituted or non-substituted alkylene group, substituted or non-substituted fluoroalkylene group or oxygen atom.)

The compound represented by the above-shown general formula (1) may be, for example, cyclic disulfonic esters represented by any one of the following general formulas (2) to (7):

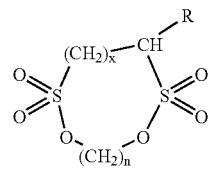

(2)

(where: x is 0 or 1; n is an integer from 1 to 5; and R is hydrogen atom, methyl group, ethyl group or halogen atom);

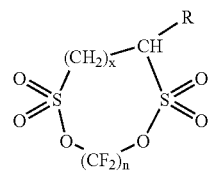

(3)

(where: x is 0 or 1; n is an integer from 1 to 5; and R is hydrogen atom, methyl group, ethyl group or halogen atom);

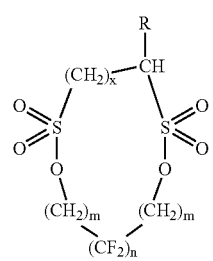

(4)

(where: x is 0 or 1; m is 1 or 2; n is an integer from 1 to 4; and R is hydrogen atom, methyl group, ethyl group or halogen atom);

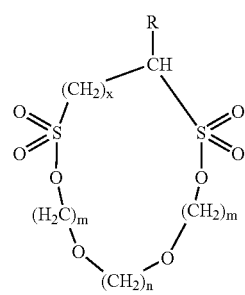

(5)

(where: x is 0 or 1; m is 1 or 2; n is an integer from 1 to 4; and R is hydrogen atom, methyl group, ethyl group or halogen atom);

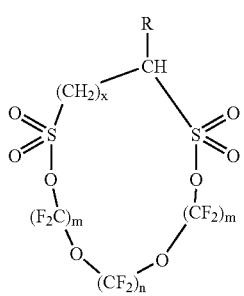

(6)

(where: x is 0 or 1; m is 1 or 2; n is an integer from 1 to 4; and R is hydrogen atom, methyl group, ethyl group or halogen atom);

(7)

(where: x is 0 or 1; m is 1 or 2; n is an integer from 1 to 4; and R is hydrogen atom, methyl group, ethyl group or halogen atom);

Further, exemplary compounds represented by the above-shown general formula (1) will be illustrated in TABLE-1, though the present invention is not limited thereto.

TABLE 1

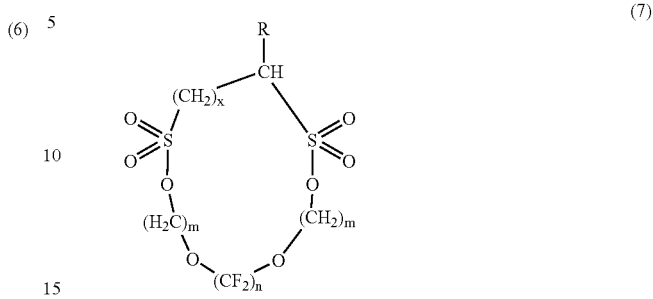

TABLE 1-continued

| COMPOUND NO. | CHEMICAL STRUCTURE | COMPOUND NO. | CHEMICAL STRUCTURE | COMPOUND NO. | CHEMICAL STRUCTURE | COMPOUND NO. | CHEMICAL STRUCTURE |
|---|---|---|---|---|---|---|---|
| 5 | | 12 | | 19 | | | |
| 6 | | 13 | | 20 | | | |
| 7 | | 14 | | 21 | | | |

The compounds represented by the general formula (1) can be produced by production methods described in, for example, U.S. Pat. No. 4,950,768, JP-B-5-44,946, West Germany Patent No. 2 509 738, West Germany Patent No. 2 233 859 and so on.

The content of the compound represented by the general formula (1) in the electrolyte solution is not particularly limited, but may preferably be contained at a concentration of 0.005% wt. to 10% wt. over the whole electrolyte solution. Having the concentration of the compounds represented by the general formula (1) of not less than 0.005% wt. provides sufficient coating effects. More preferably, the compound may be added at a concentration of not less than 0.01% wt. to further improve the battery properties. On the other hand, the concentration of not higher than 10% wt. provides prohibiting the increase of the viscosity of the electrolyte solution, and accompanying increase of resistance. More preferably, the compound may be added at a concentration of not higher than 5% wt. to further improve the battery properties.

The electrolyte solution 15, which comprises cyclic sulfonic ester including at least two sulfonyl groups, may additionally contain a compound having at least one sulfonyl group. In addition, a compound represented by the following general formula (8) may be included:

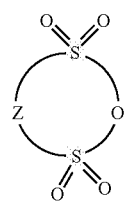

(8)

(where: Z is substituted or non-substituted alkylene group containing 2–4 carbons, substituted or non-substituted alkenylene group containing 2–4 carbons, substituted or non-substituted aromatic cyclic group or substituted or non-substituted hetero cyclic group.)

Further, sultone compound represented by the following general formula (9) may be added:

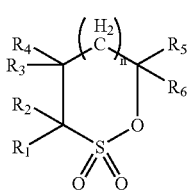

(9)

(where: n is an integer from 0 to 2; and $R_1$–$R_6$ is separately selected from the group consisting of hydrogen atom, alky group containing 1 to 12 carbons, cycloalkyl group containing 3 to 6 carbons and aryl group containing 6 to 12 carbons.)

In addition to cyclic sulfonic ester including at least two sulfonyl groups, the compound containing sulfonyl group represented by the general formula (8) and/or the general formula (9) may be added to suitably adjust the viscosity, thereby improving the stability of the coating, and to improve the prohibition of decomposition of solvent molecule and the removal of the moisture.

More specifically, the compounds containing sulfonyl group may be: sulfolane (JP-A-S60-154,478); 1,3-propane sultone or 1,4-propane sultone (JP-A-S62-100,948, JP-A-S63-102,173, JP-A-H11-339,850 and JP-A-2000-3,724); alkane sulfonate anhydride (JP-A-H10-189,041); γ-sultone compound (JP-A-2000-23,866); sulfolene derivatives (JP-A-2000-294,278) and so on, but not limited thereto.

When sulfonyl compound is added to the electrolyte solution in addition to cyclic sulfonic ester including at least two sulfonyl groups, the amount of the addition of sulfonyl compound may be adjusted to obtain a concentration thereof of 0.005% wt. to 10% wt. in the electrolyte solution. Having the concentration of not less than 0.005% wt. provides effectively forming the coating on the anode. More preferably, the sulfonyl compound may be added at a concentration of not less than 0.01% wt. On the other hand, the concentration of not higher than 10% wt. provides maintaining the good solubility of sulfonyl compound in the electrolyte solution, and prohibiting the increase of the viscosity of the electrolyte solution. More preferably, the sulfonyl compound may be added at a concentration of not higher than 5% wt.

When the compound represented by the above-shown general formula (8) or the compound represented by the above-shown general formula (9) is added into the electrolyte solution 15, the compound may preferably be added at a weight ratio over the cyclic sulfonic ester including at least two sulfonyl groups of 0.01 to 100. This configuration ensures providing the combined effect of the plurality of additives. Thus, the cycle properties may further be improved.

The electrolyte solution 15 may be obtained by dissolving or dispersing cyclic sulfonic ester including at least two sulfonyl groups, and optionally a compound containing sulfonyl group, lithium salt and other additives as required, into non-proton solvent. Additives having different properties are mixed to form coatings having different properties onto the anode, thereby improving the battery properties.

Imide anion and transition metal ion may be additionally added to the electrolyte solution as other additives. Alternatively, the electrolyte solution may include lithium salt and metal complex of imide anion and transition metal. More specifically, two methods are available for preparing this type of electrolyte solution: a method of dissolving imide compound and transition metal compound and then dissolving the compound represented by the general formula (1); and a method of dissolving the precedently synthesized metal complex of transition metal cation and imide anion and then dissolving cyclic sulfonic ester including at least two sulfonyl groups.

When the electrolyte solution 15 includes imide anion and transition metal ion, metal complex of imide anion and transition metal is formed on the anode surface by conducting the charging and discharging (68th Annual Meeting of The Electrochemical Society of Japan (September 2000, at CHIBA INSTITUTE OF TECHNOLOGY, Number of presentation; 2A24), and The 41st Battery Symposium in Japan (November 2000, at NAGOYA INTERNATIONAL CONFERENCE HALL, Number of presentation; 1E03.)) Alternatively, when metal complex of imide anion and transition metal ion is included therein in advance, the aforementioned metal complex is adsorbed on the anode surface without conducting the charging and discharging, since the metal complex is already synthesized before being dissolved, thus there is no need to conduct the charging and discharging for carrying out synthesizing. Employing this type of metal complex containing imide anion provides forming uniform coating on the anode surface in the electrolyte solution, so that the electrical field can be uniformly generated during the charging process, and thus smooth absorption or deposition process of lithium can be achieved. In particular, when metallic lithium is employed, the coating that is chemically and physically resistant and has lower resistivity is formed on the anode.

In such case, two compounds of metal complex of imide anion and transition metal and cyclic sulfonic ester including at least two sulfonyl groups simultaneously exist on the anode surface. Metal complex adsorbs onto the portions of the anode surface having no reactivity to function as a conductor of lithium ion, regardless of employing metal complex generated by adding imide salt or metal complex synthesized in advance from imide salt and transition metal.

Cyclic sulfonic ester including at least two sulfonyl groups is the critical component of the electrolyte solution for the secondary battery according to the present invention, and contributes in forming the passivating coating onto the anode surface, resulting that the decomposition of the solvent molecule is avoided. Further, cyclic sulfonic ester including at least two sulfonyl groups reacts with a slight amount of water existing on the anode surface or in the electrolyte solution, and thus effectively removes moisture therefrom.

Imide anions contained in the electrolyte solution 15 may be, for example, a chemical species represented by $^-N(C_nF_{2n+1}SO_2)(C_mF_{2m+1}SO_2)$ (where n and m are independently integer of 1 to 6.) In particular, perfluoroethylsulfonylimideanion [$^-N(C_2F_5SO_2)$] is preferable in view of providing the inhibition of aluminum corrosion.

Preferable transition metal may be lanthanoid transition metal, and in particular, any one of europium (Eu), neodymium (Nd), erbium (Er) or holmium (Ho) or compounds thereof is more preferable. This is because the oxidation-reduction potentials of Eu, Nd, Er and Ho are equivalent to or higher than that of graphite, alloys and lithium, and because these metals are capable of being reduced at a potential of equivalent to or more than 0 V to 0.8 V higher than the case of lithium. As such, the reduction of these metals can be prevented by selecting a metal to have an oxidation-reduction potential that is close to the oxidation-reduction potential of the anion active material, and selecting anion that is capable of forming stable complex with such metal. Thus, complex of lanthanoid transition metal and imide anion is capable of more stably existing at the interface between the anode and the electrolyte solution.

When the electrolyte solution is prepared by dissolving imide compound and transition metal compound and then dissolving cyclic sulfonic ester including at least two sulfonyl groups, available imide compound and transition metal compound are not particularly limited, and the amount of the addition of these compounds may preferably be adjusted to obtain a concentration thereof of 0.005% wt. to 10% wt. in the electrolyte solution. Having the concentration of not less than 0.005% wt. provides propagating the advantageous effect of these compounds across the entire surface of the electrode, thereby providing the sufficient effect in forming the coating on the anode surface. More preferably, these compounds may be added at a concentration of not less than 0.05% wt. On the other hand, the concentration of not higher than 10% wt. provides prohibiting the increase of the viscosity of the electrolyte solution, and thus the increase of resistance of the electrolyte solution can be prevented. More preferably, the compound may be added at a concentration of not higher than 5% wt. In such condition, the content of sulfonic acid anhydride in the whole electrolyte solution may preferably be 0.01% wt. to 10% wt. Having the concentration of not less than 0.01% wt. provides propagating the advantageous effect of these compounds across the entire surface of the electrode. Also, the concentration of not higher than 10% wt. provides prohibiting the increase of the viscosity of the electrolyte solution, and thus the resistance of the electrolyte solution can be decreased.

When the electrolyte solution is prepared by dissolving the precedently synthesized metal complex of transition metal cation and imide anion and then dissolving cyclic sulfonic ester including at least two sulfonyl groups, available metal complex contained in the electrolyte solution is not particularly limited, and the concentration of the additional metal complex may preferably be 0.005% wt. to 10% wt. in the whole electrolyte solution for the similar reason as described above. In such condition, the content of sulfonic acid anhydride in the whole electrolyte solution may preferably be 0.01% wt. to 10% wt. for the similar reason as described above.

The cycle properties and/or the effect of inhibiting the increase of resistance of the secondary battery can be improved by adding vinylene carbonate (VC) or derivatives thereof into the electrolyte solution 15. Available VC or the derivatives thereof are described in, for example, JP-A-H4-169,075, JP-A-H7-122,296, JP-A-H8-45,545, JP-A-H5-82,138, JP-A-H5-74,486, JP-A-H6-52,887, JP-A-H11-260,401, JP-A-2000-208,169, JP-A-2001-35,530 and JP-A-2000-138,071, and these disclosed compounds can be suitably employed.

The amount of the addition of VC or derivatives thereof may preferably be adjusted to obtain a concentration thereof of 0.01% wt. to 10% wt. in the whole electrolyte solution. Having the concentration of not less than 0.01% wt. provides obtaining preferable cycle properties, and further provides inhibiting the increase of resistance during storing at elevated temperature. Having the concentration of not higher than 10% wt. provides decreasing the resistance of the electrolyte solution.

The electrolyte solution for the secondary battery of this configuration may further have a constitution of additionally including lithium salt as an additional electrolyte. This constitution further improves the battery properties, since lithium ion functions as a transportation material. Lithium salt may be one or more compound(s) selected from the group consisting of: lithium imide salt; $LiPF_6$; $LiBF_4$; $LiAsF_6$; $LiSbF_6$; $LiClO_4$; $LiAlCl_4$; and $LiN(C_nF_{2n+1}SO_2)(C_mF_{2m+1}SO_2)$ (where: n and m are integer numbers.) In particular, $LiPF_6$ or $LiBF_4$ may preferably be employed. These compounds are used to enhance the electric conductivity of the lithium salt, thereby further improving the cycle properties of the secondary battery.

The electrolyte solution 15 may includes one or more solvent(s) as non-proton solvent selected from the group consisting of: cyclic carbonates; linear carbonates; aliphatic carboxylic acid esters; γ-lactones; cyclic ethers; linear ethers; and fluoro-derivatives thereof.

More specifically, the electrolyte solution may include one or mixture of two or more solvent(s) selected from the group consisting of: cyclic carbonates such as propylene carbonate (PC), ethylene carbonate (EC), butylene carbonate (BC), vinylene carbonate (VC) or the like; linear carbonates such as dimethyl carbonate (DMC), diethyl carbonate (DEC), ethylmethyl carbonate (EMC), dipropyl carbonate (DPC) or the like; aliphatic carboxylic acid esters such as methyl formate, methyl acetate, ethyl propionate or the like; γ-lactones such as γ-butyrolactone or the like; linear ethers such as 1,2-diethoxy ethane (DEE), ethoxymethoxy ethane (EME) or the like; cyclic ethers; such as tetrahydrofuran, 2-methyl tetrahydrofuran or the like; dimethyl sulfoxide; 1,3-dioxolane; formamide; acetamide; dimethyl formamide; acetonitrile; propylnitrile; nitromethane; ethylmonoglyme; phosphotriester; trimethoxymethane; dioxolane derivatives; sulfolane; methylsulfolane; 1,3-dimethyl-2-imidazolidinone; 3-methyl-oxazolidinone; propylenecarbonate derivatives; tetrahydrofuran derivatives; ethylether; N-methylpyrrolidone; fluorinated carboxylic acid ester; methyl-2,2,2-trifluoroethylcarbonate; methyl-2,2,3,3,3,-pentafluoropropylcarbonate; trifluoromethylethylenecarbonate; monofluoromethylethylenecarbonate; difluoromethylethylenecarbonate; 4,5-difluoro-1,3-dioxolane-2-one; and monofluoroethylenecarbonate.

In the secondary battery shown in FIG. 1, the available anode active materials for the use in the layer 13 comprising the anode active material may be one or more selected from the group consisting of: for example, metallic lithium; lithium alloy; and materials that is capable of intercalating and deintercalating lithium. The available materials that are capable of intercalating and deintercalating lithium may be carbon materials or oxides.

The available carbon materials may be: graphite that is capable of absorbing lithium; amorphous carbons; diamond-like-carbons; carbon nanotube or the like; or combination of oxides thereof. In these materials, graphite materials and amorphous carbons are more preferable. In particular, graphite materials are particularly preferable, since graphite materials have higher electric conductivity, are superior in adhesiveness with the electric collector comprising metals such as copper, and electric voltage flatness, and contain less impurities because of being formed at elevated temperature, being advantageous in improving the anode characteristics.

The available oxides may be one or combination of: silicon oxide; tin oxide; indium oxide; zinc oxide; lithium oxide; phosphoric acid; or boric acid. In particular, the preferable oxide may contain silicon oxide. The state of the oxides may preferably be amorphous state. These preferable configurations are because silicon oxide is stable so that there is very small concern in reacting with other materials, and because amorphous state does not induce the deterioration of the quality due to the unevenness of the material such as forming crystal grain boundaries or defects. The preferable method for forming oxides may be vacuum evaporation, CVD (chemical vapor deposition), sputtering or the like.

Lithium alloys may comprise lithium and a metal that is capable of forming alloys with lithium. For example, lithium alloys may be formed of binary alloy or ternary alloy comprising lithium and, for example: Al; Si; Pb; Sn; In; Bi; Ag; Ba; Ca; Hg; Pd; Pt; Te; Zn; La or the like. The preferable metallic lithium or lithium alloy may be in amorphous state. This is because amorphous state does not induce the deterioration of the quality due to the unevenness of the material such as forming crystal grain boundaries or defects.

The metallic lithium or lithium alloys may be produced by a suitable process such as: melting and cooling process; liquid quenching process; atomization process; vacuum evaporation process; sputtering process; plasma CVD process; optical CVD process; thermal CVD process; sol-gel process or the like.

In the anode of the secondary battery shown in FIG. 1, it is preferable to employ complex of transition metal cation and imide anion, which is located on the interface with the electrolyte solution, so that the anode is modified therewith to have flexibility or compliance against the volume variation of metal or alloy layers, to be uniform in ion distribution thereon and to be superior in physical and chemical stability. This modification of the anode may effectively prevent the dendrite deposition and lithium pulverization, thereby improving the cycle properties and the life thereof.

When the carbon materials or oxide materials are employed for the anode, the dangling bond existing on the surface thereof, which has higher chemical activity, contributes to easily decompose the solvent. In order to solve this problem, complex of transition metal cation and imide anion is used to be adsorbed on the surface of the anode, so that the decomposition of the solvent is inhibited to considerably decrease the irreversible capacity, thereby maintaining the charging-discharging efficiency at higher level.

Further, when the coating is mechanically damaged, lithium fluoride, which is a reaction product between lithium existing on the anode surface and the aforementioned imide anion adsorbing onto the anode surface, functions as repairing the damaged portion of the coating, and thus the configuration provides the advantageous effect of forming the stable surface compound even after the coating is damaged.

In the present configuration, the available cathode active material may be lithium-containing combined oxides such as, for example, $LiCoO_2$, $LiNiO_2$, $LiMn_2O_4$ or the like, or substituted compounds of these lithium-containing combined oxides, the transition metal portion of which is substituted with other elements.

Further, lithium-containing combined oxides having a plateau region at a metallic lithium counter electrode voltage of not less than 4.5 V may be employed. The available lithium-containing combined oxides may be: spinel structure lithium-manganese combined oxide; olivine structure lithium-containing combined oxide; inverse spinel structure lithium-containing combined oxide or the like. Lithium-containing combined oxide may be a compound represented by the general formula (10):

$$Li_a(M_xMn_{2-x})O_4 \tag{10}$$

(where: $0<x<2$; $0<a<1.2$; and M is at least one selected from the group consisting of Ni, Co, Fe, Cr and Cu.)

The cathode of the secondary battery according to the present configuration may be produced by: dispersing and kneading these active materials into a solvent such as N-methyl-2-pyrrolidone (NMP) or the like with a electric conductive material such as carbon black or the like and a binder such as polyvinylidenefluoride (PVDF) or the like; and applying the obtained compound over a base material such as aluminum foil or the like.

The secondary battery shown in FIG. 1 may be manufactured by: laminating an anode and a cathode with a separator therebetween in a dry air ambient or inert gas ambient; winding the lamination; then accommodating the resultant winded product within a battery can or encapsulating with a packaging such as a packaging made of a laminate of synthetic resin film and a metallic foil; and dipping the resultant winding product into the electrolyte solution represented by the above-shown general formula (1). Then, after the packaging is sealed, the secondary battery is charged, so that a coating is formed onto the anode surface. Here, the separator may be a porous film made of polyolefin such as polypropylene or polyethylene, or fluoro resin.

The form of the secondary battery of the present invention is not particularly limited, but the secondary battery may be made in a form of cylinder shape, polygonal shape, laminated packaging shape, coin shape or the like.

EXAMPLES

Example 1

(Preparation of the Battery)

Preparation of the battery according to the present example will be described. An aluminum foil having a thickness of 20 μm was employed for a cathode active material, and $LiMn_2O_4$ was employed for an anode active material. A copper foil having a thickness of 10 μm was employed for an anode electric collector, and metallic lithium as an anode active material was deposited on the copper foil to a thickness of 20 μm to form an anode. A mixed solvent of EC and DEC (in a volumetric ratio of 30:70) was employed for an electrolyte solution, and 1 $molL^{-1}$ of $LiN(C_2F_5SO_2)_2$ (hereinafter abbreviated to as LiBETI) as a support electrolyte was dissolved into the solvent, and further the compound No. 1 shown in the above TABLE-1 was added thereto to achieve a concentration of the compound No. 1 of 1% wt. Then, the anode and the cathode were laminated, between which a separator comprising polyethylene was disposed, to form a laminate packaging secondary battery.

(Charge-Discharge Cycle Test)

Charge-discharge tests were conducted for the lithium secondary battery in a condition of: a temperature of 20 degree. C., a charge rate of 0.05 C., a discharge rate of 0.1 C., a charge voltage of 4.2 V, a discharge terminated voltage of 3.0 V, and an occupancy rate of the metallic lithium anode (a discharge depth) of 30%. The capacity retention ratio (%) can be calculated by dividing a discharge capacity (mAh) after conducting 400 cycles by a discharge capacity (mAh) after conducting 10 cycles. The results obtained by conducting the cycle test are shown in the TABLE-2.

Examples 2–4

Secondary batteries were prepared in the same manner as in Example 1 except that the compound No. 1 was replaced with the compound shown in TABLE-2. The battery properties were examined in the same manner as in Example 1. The results are shown in the TABLE-2.

Comparative Example 1

A secondary battery was prepared in the same manner as in Example 1 except that the compound No. 1 was not added to the electrolyte solution. The battery properties were examined in the same manner as in Example 1. The results are shown in the TABLE-2.

Comparative Example 2

A secondary battery was prepared in the same manner as in Example 1 except that the compound No. 1 is replaced with 1,3-propanesultone (1,3-PS.) The battery properties were examined in the same manner as in Example 1. The results are shown in the TABLE-2.

TABLE-2

| | Anode Active Material | Solvent | Compound Represented by General Formula (1) | Capacity Retention Ratio (%) after 400 cycles |
|---|---|---|---|---|
| Example 1 | Li metal | EC/DEC | Compound No.1 | 86.7 |
| Example 2 | Li metal | EC/DEC | Compound No.4 | 83.1 |
| Example 3 | Li metal | EC/DEC | Compound No.9 | 82.9 |
| Example 4 | Li metal | EC/DEC | Compound No.12 | 81.4 |
| Comparative Example 1 | Li metal | EC/DEC | none | 45.6 |
| Comparative Example 2 | Li metal | EC/DEC | 1,3-PS | 57.5 |

It was confirmed that the batteries prepared in Examples 1–4 had improved capacity retention ratio after conducting the cycle tests, i.e., improved cycle properties, as compared with the batteries prepared in Comparative Examples 1 and 2.

Example 5

A secondary battery was prepared in the same manner as in Example 1 except that: LiBRTI for the support electrolyte was replaced with $LiPF_6$; and the anode was prepared by applying onto a copper foil a paste mixture of graphite power, a binder of a mixture of a solvent of N-methyl-2-pyrrolidone and polyfluorovinylidene dissolved in the solvent and an electric conductor material, and drying the resultant copper foil. In this Example, a cylindrical secondary battery was prepared. The battery properties were examined in the same manner as in Example 1. The results are shown in the TABLE-3.

Examples 6–8

Secondary batteries were prepared in the same manner as in Example 5 except that the compound No. 1 was replaced with the compound shown in TABLE-3. The battery properties were examined in the same manner as in Example 5. The results are shown in the TABLE-3.

Comparative Example 3

A secondary battery was prepared in the same manner as in Example 5 except that the compound No. 1 was not added to the electrolyte solution. The battery properties were examined in the same manner as in Example 5. The results are shown in the TABLE-3.

TABLE-3

| | Anode Active Material | Solvent | Compound Represented by General Formula (1) | Capacity Retention Ratio (%) after 400 cycles |
|---|---|---|---|---|
| Example 5 | graphite | EC/DEC | Compound No.1 | 89.4 |
| Example 6 | graphite | EC/DEC | Compound No.4 | 85.2 |
| Example 7 | graphite | EC/DEC | Compound No.9 | 85.0 |
| Example 8 | graphite | EC/DEC | Compound No.12 | 83.9 |
| Comparative Example 3 | graphite | EC/DEC | none | 78.5 |

It was confirmed that the batteries prepared in Examples 5–8 had improved capacity retention ratio after conducting the cycle tests, i.e., improved cycle properties, as compared with the battery prepared in Comparative Example 3.

Example 9

A secondary battery was prepared in the same manner as in Example 5 except that: graphite was replaced with amorphous carbon; and PC/EC/DEC (in a volumetric ratio of: 20/20/60) was employed for the main solvent of the electrolyte solution. The battery properties were examined in the same manner as in Example 5. The results are shown in the TABLE-4.

Examples 10–12

Secondary batteries were prepared in the same manner as in Example 9 except that the compound No. 1 was replaced with the compound shown in TABLE-4. The battery properties were examined in the same manner as in Example 9. The results are shown in the TABLE-3.

Comparative Example 4

A secondary battery was prepared in the same manner as in Example 9 except that the compound No. 1 was not added to the electrolyte solution. The battery properties were examined in the same manner as in Example 9. The results were shown in the TABLE-4.

TABLE-4

| | Anode Active Material | Solvent | Compound Represented by General Formula (1) | Capacity Retention Ratio (%) after 400 cycles |
|---|---|---|---|---|
| Example 9 | amorphous carbon | PC/EC/DEC | Compound No.1 | 89.8 |
| Example 10 | amorphous carbon | PC/EC/DEC | Compound No.4 | 85.8 |
| Example 11 | amorphous carbon | PC/EC/DEC | Compound No.9 | 84.4 |

TABLE-4-continued

| | Anode Active Material | Solvent | Compound Represented by General Formula (1) | Capacity Retention Ratio (%) after 400 cycles |
|---|---|---|---|---|
| Example 12 | amorphous carbon | PC/EC/DEC | Compound No.12 | 82.5 |
| Comparative Example 4 | amorphous carbon | PC/EC/DEC | none | 76.3 |

It was confirmed that the batteries prepared in Examples 9–12 had improved capacity retention ratio after conducting the cycle tests, i.e., improved cycle properties, as compared with the battery prepared in Comparative Example 4.

Example 13

A secondary battery was prepared in the same manner as in Example 1 except that the electrolyte solution further included 1,3-propanesultone (hereinafter abbreviated as 1,3-PS) at a concentration of 1% wt. The battery properties were examined in the same manner as in Example 1. The results are shown in the TABLE-5.

Examples 14–16

Secondary batteries were prepared in the same manner as in Example 13 except that the compound No. 1 was replaced with the compound shown in TABLE-5. The battery properties were examined in the same manner as in Example 13. The results are shown in the TABLE-5.

TABLE 5

| | Anode Active Material | Solvent | Compound Represented by General Formula (1) | Other Additives | Capacity Retention Ratio (%) after 400 cycles |
|---|---|---|---|---|---|
| Example 13 | Li metal | EC/DEC | Compound No.1 | 1,3-PS | 90.9 |
| Example 14 | Li metal | EC/DEC | Compound No.4 | 1,3-PS | 87.5 |
| Example 15 | Li metal | EC/DEC | Compound No.9 | 1,3-PS | 87.2 |
| Example 16 | Li metal | EC/DEC | Compound No.12 | 1,3-PS | 85.8 |
| Comparative Example 1 | Li metal | EC/DEC | none | none | 45.6 |

It was confirmed that the batteries prepared in Examples 13–16 had improved capacity retention ratio after conducting the cycle tests, i.e., improved cycle properties, as compared with the batteries prepared in Examples 1–4 and Comparative Example 1. This is due to the combined advantageous effects raised by the use of the compound represented by the general formula (1) and by the use of 1,3-PS.

Example 17

A secondary battery was prepared in the same manner as in Example 5 except that the electrolyte solution further included 1,3-propanesultone (hereinafter abbreviated as 1,3-PS) at a concentration of 1% wt. The battery properties were examined in the same manner as in Example 5. The results are shown in the TABLE-6.

Examples 18–20

Secondary batteries were prepared in the same manner as in Example 17 except that the compound No. 1 was replaced with the compound shown in TABLE-6. The battery properties were examined in the same manner as in Example 17. The results are shown in the TABLE-6.

TABLE 6

| | Anode Active Material | Solvent | Compound Represented by General Formula (1) | Other Additives | Capacity Retention Ratio (%) after 400 cycles |
|---|---|---|---|---|---|
| Example 17 | graphite | EC/DEC | Compound No.1 | 1,3-PS | 90.6 |
| Example 18 | graphite | EC/DEC | Compound No.4 | 1,3-PS | 87.5 |
| Example 19 | graphite | EC/DEC | Compound No.9 | 1,3-PS | 86.9 |
| Example 20 | graphite | EC/DEC | Compound No.12 | 1,3-PS | 85.9 |
| Comparative Example 3 | graphite | EC/DEC | none | none | 78.5 |

It was confirmed that the batteries prepared in Examples 17 to 20 had improved capacity retention ratio after conducting the cycle tests, i.e., improved cycle properties, as compared with the batteries prepared in Examples 5 to 8 and Comparative Example 3. This is due to the combined advantageous effects raised by the use of the compound represented by the general formula (1) and by the use of 1,3-PS.

Example 21

A secondary battery was prepared in the same manner as in Example 9 except that the electrolyte solution further included 1,3-propanesultone (hereinafter abbreviated as 1,3-PS) at a concentration of 1% wt. The battery properties were examined in the same manner as in Example 9. The results are shown in the TABLE-7.

Examples 22–24

Secondary batteries were prepared in the same manner as in Example 21 except that the compound No. 1 was replaced with the compound shown in TABLE-7. The battery properties were examined in the same manner as in Example 21. The results are shown in the TABLE-7.

TABLE 7

|  | Anode Active Material | Solvent | Compound Represented by General Formula (1) | Other Additives | Capacity Retention Ratio (%) after 400 cycles |
|---|---|---|---|---|---|
| Example 21 | amorphous carbon | PC/EC/DEC | Compound No.1 | 1,3-PS | 90.7 |
| Example 22 | amorphous carbon | PC/EC/DEC | Compound No.4 | 1,3-PS | 87.8 |
| Example 23 | amorphous carbon | PC/EC/DEC | Compound No.9 | 1,3-PS | 86.8 |
| Example 24 | amorphous carbon | PC/EC/DEC | Compound No.12 | 1,3-PS | 84.6 |
| Comparative Example 4 | amorphous carbon | PC/EC/DEC | none | none | 76.3 |

It was confirmed that the batteries prepared in Examples 21–24 had improved capacity retention ratio after conducting the cycle tests, i.e., improved cycle properties, as compared with the batteries prepared in Examples 9–12 and Comparative Example 4. This is due to the combined advantageous effects raised by the use of the compound represented by the general formula (1) and by the use of 1,3-PS.

Examples 25–28

Secondary battery were prepared in the same manner as in Example 9 except that the electrolyte solution further included salts of lanthanide transition metals shown in TABLE-8 having $CF_3SO_3^-$ anion at a concentration of 0.3% wt. The battery properties were examined in the same manner as in Example 9. The results are shown in the TABLE-8.

TABLE 8

|  | Anode Active Material | Solvent | Transition Metal Ion | Compound Represented by General Formula (1) | Capacity Retention Ratio (%) after 400 cycles |
|---|---|---|---|---|---|
| Example 25 | amorphous carbon | PC/EC/DEC | $Eu^{3+}$ | Compound No.1 | 91.2 |
| Example 26 | amorphous carbon | PC/EC/DEC | $Ho^{3+}$ | Compound No.1 | 90.3 |
| Example 27 | amorphous carbon | PC/EC/DEC | $Nd^{3+}$ | Compound No.1 | 89.6 |
| Example 28 | amorphous carbon | PC/EC/DEC | $Er^{3+}$ | Compound No.1 | 89.4 |
| Comparative Example 4 | amorphous carbon | PC/EC/DEC | none | none | 76.3 |

It was confirmed that the batteries prepared in Examples 25–28 had improved capacity retention ratio after conducting the cycle tests, i.e., improved cycle properties, as compared with the batteries prepared in Comparative Example 4 and Example 9.

Examples 29–32

Secondary batteries were prepared in the same manner as in Example 9 except that the electrolyte solution further included lanthanide transition metal complex listed in TABLE-9 at a concentration of 0.1% wt. The battery properties were examined in the same manner as in Example 9. The results are shown in the TABLE-9.

TABLE 9

| | Anode Active Material | Solvent | Metal Complex | Compound Represented by General Formula (1) | Capacity Retention Ratio (%) after 400 cycles |
|---|---|---|---|---|---|
| Example 29 | amorphous carbon | PC/EC/DEC | Eu[N(C$_2$F$_5$SO$_2$)$_2$]$_3$ | Compound No.1 | 91.8 |
| Example 30 | amorphous carbon | PC/EC/DEC | Ho[N(C$_2$F$_5$SO$_2$)$_2$]$_3$ | Compound No.1 | 90.9 |
| Example 31 | amorphous carbon | PC/EC/DEC | Nd[N(C$_2$F$_5$SO$_2$)$_2$]$_3$ | Compound No.1 | 90.6 |
| Example 32 | amorphous carbon | PC/EC/DEC | Er[N(C$_2$F$_5$SO$_2$)$_2$]$_3$ | Compound No.1 | 90.1 |
| Comparative Example 4 | amorphous carbon | PC/EC/DEC | none | none | 76.3 |

It was confirmed that the batteries prepared in Examples 29–32 had improved cycle properties as compared with the batteries prepared in Comparative Example 4 and Example 9.

Example 33

A secondary battery was prepared in the same manner as in Example 9 except that the electrolyte solution further included vinylene carbonate (hereinafter abbreviated as VC) at a concentration of 1% wt. The battery properties were examined in the same manner as in Example 9. The results are shown in the TABLE-10.

Examples 34–36

Secondary batteries were prepared in the same manner as in Example 33 except that the compound No. 1 was replaced with the compound shown in TABLE-10. The battery properties were examined in the same manner as in Example 33. The results are shown in the TABLE-10.

It was confirmed that the batteries prepared in Examples 33–36 had improved capacity retention ratio after conducting the cycle tests, i.e., improved cycle properties, as compared with the batteries prepared in Comparative Example 4 and Examples 9–12.

Example 37

A secondary battery was prepared in the same manner as in Example 9 except that the electrolyte solution further included vinylene carbonate (hereinafter abbreviated as VC) and 1,3-PS at respective concentration of 1% wt. The battery properties were examined in the same manner as in Example 9. The results are shown in the TABLE-11.

Examples 38–40

Secondary batteries were prepared in the same manner as in Example 37 except that the compound No. 1 was replaced with the compound shown in TABLE-11. The battery properties were examined in the same manner as in Example 37. The results are shown in the TABLE-11.

TABLE 10

| | Anode Active Material | Solvent | Compound Represented by General Formula (1) | Other Additives | Capacity Retention Ratio (%) after 400 cycles |
|---|---|---|---|---|---|
| Example 33 | amorphous carbon | PC/EC/DEC | Compound No.1 | VC | 90.6 |
| Example 34 | amorphous carbon | PC/EC/DEC | Compound No.4 | VC | 88.5 |
| Example 35 | amorphous carbon | PC/EC/DEC | Compound No.9 | VC | 88.3 |
| Example 36 | amorphous carbon | PC/EC/DEC | Compound No.12 | VC | 86.2 |
| Comparative Example 4 | amorphous carbon | PC/EC/DEC | none | none | 76.3 |

TABLE 11

|  | Anode Active Material | Solvent | Compound Represented by General Formula (1) | Other Additives | Capacity Retention Ratio (%) after 400 cycles |
|---|---|---|---|---|---|
| Example 37 | amorphous carbon | PC/EC/DEC | Compound No.1 | VC + 1,3-PS | 91.9 |
| Example 38 | amorphous carbon | PC/EC/DEC | Compound No.4 | VC + 1,3-PS | 89.9 |
| Example 39 | amorphous carbon | PC/EC/DEC | Compound No.9 | VC + 1,3-PS | 88.7 |
| Example 40 | amorphous carbon | PC/EC/DEC | Compound No.12 | VC + 1,3-PS | 87.2 |
| Comparative Example 4 | amorphous carbon | PC/EC/DEC | none | none | 76.3 |

It was confirmed that the batteries prepared in Examples 38–40 had improved capacity retention ratio after conducting the cycle tests, i.e., improved cycle properties, as compared with the batteries prepared in Comparative Example 4 and Examples 9–12 and Examples 33–36. This is due to the combined advantageous effects raised by the use of the compound represented by the general formula (1) and by the use of VC and 1,3-PS.

Example 41

A secondary battery as same as one prepared in Example 9 was prepared, using the compound No. 1 as one additive for the electrolyte solution. In this example, resistance variation of the secondary battery during the storage was measured. First, one charging operation and one discharging operation of the prepared secondary battery were conducted at 20 degree. C. The charging current and discharging current of this charging and discharging processes were constant, and the discharging capacity at this discharging process was determined as an initial capacity and the resistance of this occasion was determined as an initial resistance. Then, discharging operation was carried out at constant current and voltage to achieve a predetermined voltage for 2.5 hours, and after that the secondary battery was left for 90 days in a condition of 45 degree. C. and 60 degree. C. After that, discharging operation under the constant current was carried out again at 20 degree. C., and subsequently one charging operation and one discharging operation of the prepared secondary battery were conducted again similarly at a constant current at 20 degree. C., and the resistance and capacity during the discharging operation were measured. The results of the resistance after 90day-storage (45 degree. C.-storage or 60 degree. C.-storage) were shown in TABLE-12, in relative values converted by the initial resistance as the initial resistance value is taken as 1. Also, the results of the capacity retention rate after conducting 60 degree. C.-storage ([discharging capacity]/[initial discharging capacity] after 90 days) were shown in TABLE-12.

Examples 42–47

Secondary batteries as same as one prepared in Example 9 were prepared, using the compounds shown in TABLE-12 as additives for the electrolyte solutions, and the evaluations were conducted in the same manner as in Example 41. The results are shown in the TABLE-12.

Comparative Example 5

A secondary battery was prepared in the same manner as in Example 41 except that 1,3-PS was employed as an additive for the electrolyte solution, and the evaluations were conducted in the same manner as in Example 41. The results are shown in the TABLE-12.

TABLE-12

|  | Compound Represented by General Formula (1) | Resistance Increase Rate after 90 days (45 Deg. C. Storage) | Resistance Increase Rate after 90 days (60 Deg. C. Storage) | Capacity Retention Ratio after 90 days (60 Deg. C. Storage) |
|---|---|---|---|---|
| Example 41 | Compound No.1 | 1.05 | 1.18 | 0.84 |
| Example 42 | Compound No.4 | 1.08 | 1.21 | 0.83 |
| Example 43 | Compound No.9 | 1.09 | 1.23 | 0.83 |
| Example 44 | Compound No.12 | 1.09 | 1.24 | 0.82 |
| Example 45 | Compound No.2 | 1.10 | 1.26 | 0.82 |
| Example 46 | Compound No.17 | 1.10 | 1.25 | 0.82 |
| Example 47 | Compound No.18 | 1.11 | 1.26 | 0.81 |
| Comparative Example 5 | 1,3-PS | 1.45 | 1.61 | 0.75 |

As can be seen in TABLE-12, it is recognized that each of the batteries prepared in Examples 41–47 had smaller resistance increase rates at respective temperature, as compared with the battery prepared in Comparative Example 5 which includes the conventional 1,3-PS, and thus it is proved that the prohibitions of the increase of resistance were successfully achieved in these examples. In particular, the considerable advantage in prohibiting the increase of resistance under 60 degree. C. was achieved. Further, the capacity retention rates were considerably improved as compared with Comparative Example 5.

Example 48

A secondary battery as same as one prepared in Example 33 was prepared, using the compound No. 1 as one additive for the electrolyte solution, and the evaluation was conducted in the same manner as in Example 41. The results are shown in the TABLE-13.

Examples 49–54

Secondary batteries as same as one prepared in Example 33 were prepared, using the compounds shown in TABLE-13 as additives, and the evaluations were conducted in the same manner as in Example 48. The results are shown in the TABLE-13.

Comparative Example 6

A secondary battery was prepared in the same manner as in Example 48 except that 1,3-PS was employed as an additive for the electrolyte solution, and the evaluations were conducted. The results are shown in the TABLE-13.

TABLE-13

| | Compound Represented by General Formula (1) | Resistance Increase Rate after 90 days (45 Deg. C. Storage) | Resistance Increase Rate after 90 days (60 Deg. C. Storage) | Capacity Retention Ratio after 90 days (60 Deg. C. Storage) |
|---|---|---|---|---|
| Example 48 | Compound No.1 | 1.01 | 1.14 | 0.88 |
| Example 49 | Compound No.4 | 1.05 | 1.19 | 0.86 |
| Example 50 | Compound No.9 | 1.03 | 1.18 | 0.86 |
| Example 51 | Compound No.12 | 1.05 | 1.20 | 0.86 |
| Example 52 | Compound No.2 | 1.02 | 1.17 | 0.85 |
| Example 53 | Compound No.17 | 1.03 | 1.20 | 0.84 |
| Example 54 | Compound No.18 | 1.05 | 1.22 | 0.84 |
| Comparative Example 6 | 1,3-PS | 1.21 | 1.55 | 0.76 |

As can be seen in TABLE-13, it is proved that the prohibitions of the increase of resistance it is proved that the prohibitions of the increase of resistance were successfully achieved in these examples, as compared with the battery prepared in Comparative Example 6 which includes the conventional 1,3-PS. In particular, the considerable advantage in prohibiting the increase of resistance under 60 degree. C. was achieved. Further, the capacity retention rates were considerably improved as compared with Comparative Example 5.

Example 55

In his example, a combined oxides of lithium manganate and lithium nickelate was employed for the cathode. A film packaging battery was experimentally prepared by using $LiNi_{0.8}Co_{0.2}O_2$ having a specific surface area of 1.7 m²/g and a packaging material of aluminum laminate film.

First, lithium manganate, $LiNi_{0.8}Co_{0.2}O_2$ and electric conductivity-providing agent were mixed in a dry condition, and the resultant mixture was uniformly dispersed into N-methyl-2-pyrrolidone (NMP) containing PVDF dissolved therein as a binder to obtain a slurry. Carbon black was employed for the electric conductivity-providing agent. The slurry was applied onto an aluminum metal foil having a thickness of 25 μm, and NMP contained in the slurry was evaporated to form a cathode sheet. The solid contents contained in the cathode was set to a ratio of: lithium manganate: $LiNi_{0.8}Co_{0.2}O_2$: a electric conductivity-providing agent: PVDF=72:8:10:10.

At the same time, the anode sheet was prepared by mixing carbon and PVDF at a volumetric ratio of carbon:PDVF=90:10 (% vol.), dispersing the resultant mixture into NMP, applying the slurry onto the copper foil of 20 μm thick and evaporating the solvent to obtain the anode sheet.

The plurality of resultant electrode sheets for the cathode and the anode were alternately built-up, with polyethylene porous film separator having a thickness of 25 μm being interposed between each anode sheet and each cathode sheet, to form a laminate electrode member having 12 layers of cathode and 13 layers of anode.

At the same time, a laminate film having a construction comprising polypropylene resin (sealed, thickness: 70 μm), polyethylene terephthalate (20 μm), aluminum (50 μm), and polyethylene terephthalate (20 μm) built-up in this turn was cut into two sheets having predetermined sizes, and a recess comprising a bottom portion and side portions having a dimension being conformal to the dimension of the above-mentioned laminate electrode member on the sheets. These two sheets having recesses were oppositely superimposed so that the each recess of each sheet faced to house the above-mentioned laminate electrode member, and then the outer peripheries of the sheets were thermally fused and bonded to form the film packaging battery. Before the last periphery thereof was bonded, the electrolyte solution was introduced therein for dipping the laminate electrode member into the electrolyte solution.

The electrolyte solution employed in this example included 0.9 M of $LiPF_6$ as a support salt. The solvent for the electrolyte solution was a mixed solvent of propylene carbonate (PC), ethylene carbonate (EC) and diethyl carbonate (DEC) (volumetric ratio: 20:20:60 (% vol.)). Additionally, the compound No. 1 was dissolved into the solution at a concentration of the compound in the electrolyte solution of 0.1 M, to obtain the electrolyte solution of the present example.

The laminate packaging secondary battery (120 mm×80 mm×4 mm) of Example 55 was prepared as described above. Charging and discharging operations were conducted by using the laminate packaging secondary battery at 25 degree. C. by the following procedure: charging operation was conducted in a condition of a constant current of 0.4 A and a constant voltage for 12.5 hours to achieve a final voltage of 4.3 V; and discharging operation was conducted at a constant current of 2 A so to achieve a final voltage of 2.5 V; and then charging operation was conducted again in a condition of a constant current of 2 A and a constant voltage for 2.5 hours to achieve a final voltage of 4.3 V.

The storage properties were evaluated by using thus obtained secondary battery. First, one charging operation and one discharging operation were carried at 25 degree. C. The charging current and the discharging current in these operations were constant (2 A), and the discharging capacity at this discharging process was determined as an initial capacity and the resistance of this occasion was determined as an initial resistance. Here, the cutoff potential at discharging side was set to 2.5 V, and the cutoff potential at charging side was set to 4.2 V. Then, charging and discharging operations were conducted by the following procedure: charging operation was conducted in a condition of a constant current of 2 A and a constant voltage for 2.5 hours to achieve 4.2 V; and then after discharging operation was conducted to achieve 50% in the discharging depth, the secondary batteries were left or stored at 55 degree. C. for 7 days, 28 days, 56 days and 84 days. After the storage, the discharging operation was conducted again at a constant current at 25 degree. C., and subsequently, the charging was conducted at a constant current and constant voltage, and then discharging was carried out at a constant current, and in this occasion, the discharging capacity was taken as a recovery capacity. Further, the charging was conducted at a constant current and constant voltage, and then after discharging operation was conducted to achieve 50% in the discharging depth, charging-discharging operations were repeated for 10 seconds at 2 A, 6 A and 14 A, so that the resistances were obtained by the correlation of the current and the voltage. The number of the experiences was 3.

Figure 2:
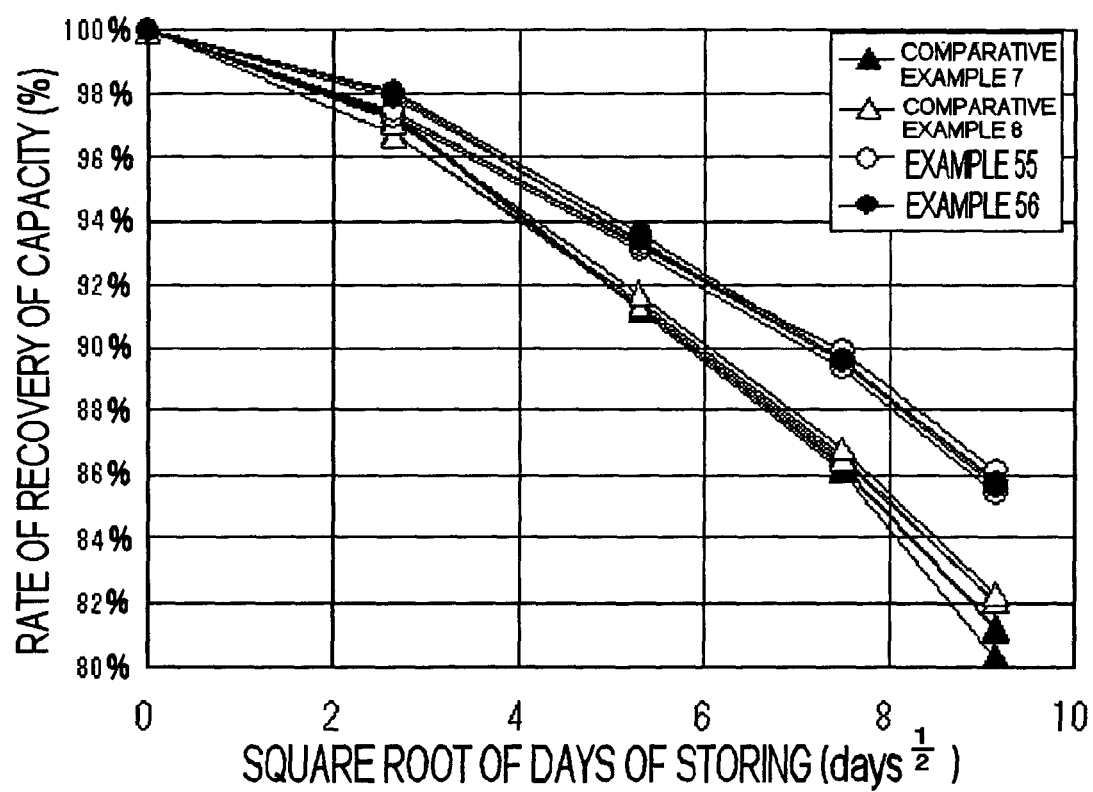
FIG. 2 is a graph showing the rate of recovery of capacity over the square root of days of storing in Examples 55 and 56 and Comparative Examples 7 and 8.
Figure 3:
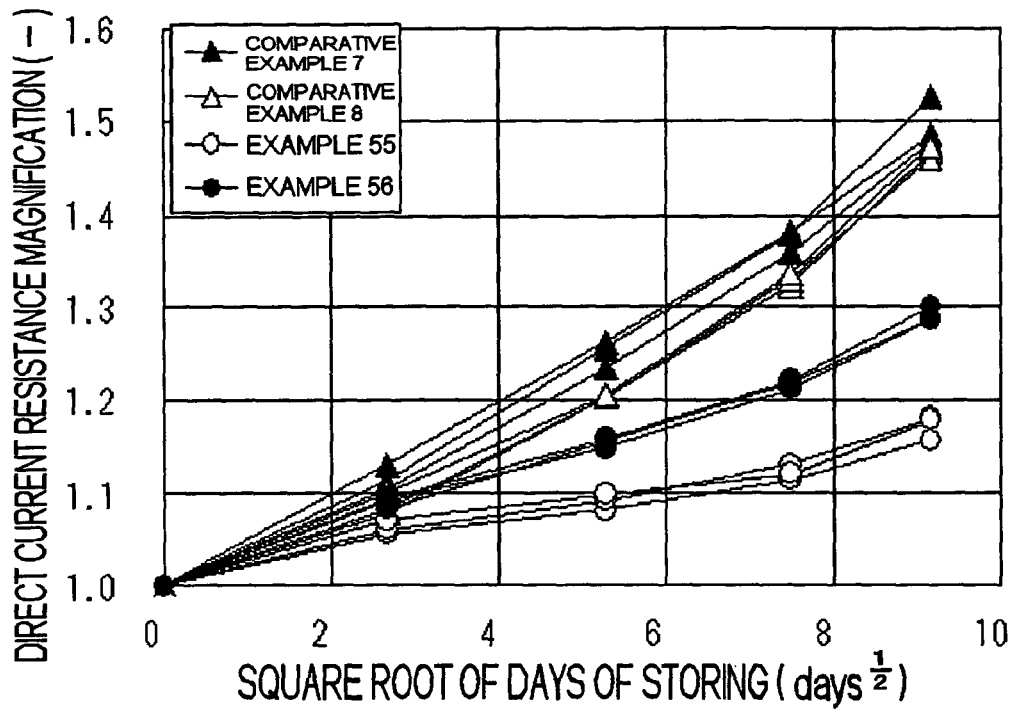
FIG. 3 is graph showing the rate of the direct current resistance magnification over the square root of days of storing in Examples 55 and 56 and Comparative Examples 7 and 8.

As shown in FIG. 2, the capacity recovery rate or the rate of the recovery of the capacity over the square root of the days for storing was significantly improved, as compared with the after-mentioned Comparative Example 7 utilizing a electrolyte solution without any additives and the Comparative Example 8 utilizing a electrolyte solution with 1,3-PS (0.1 M) and VC (0.1M). Further, as shown in FIG. 3, the resistance increase rate over the square root of the days for storing was significantly prohibited, as compared with the after-mentioned Comparative Example 7 utilizing a electrolyte solution without any additives and the after-mentioned Comparative Example 8 utilizing a electrolyte solution with 1,3-PS (0.1 M) and VC (0.1M).

Figure 4:
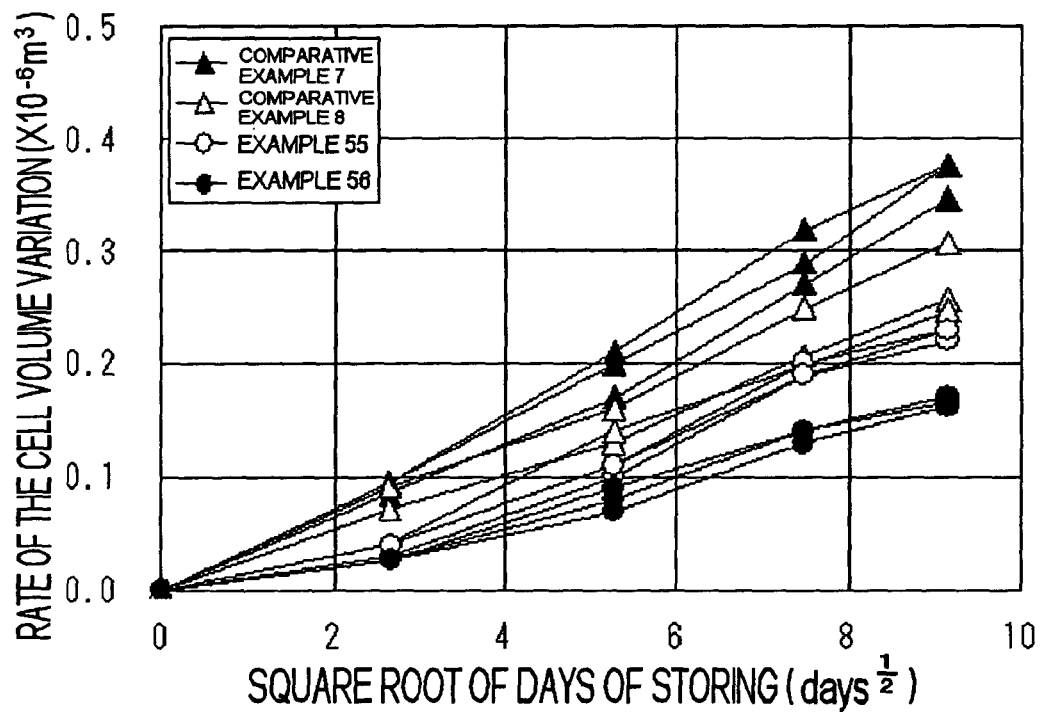
FIG. 4 is graph showing the rate of the cell volume variation over the square root of days of storing in Examples 55 and 56 and Comparative Examples 7 and 8.

It is considered that these results are obtained because the compounds represented by the general formula (1) of the present invention, which are added to the electrolyte solution, provides higher ion conductivity as compared with non-additive type electrolyte solution or conventional type electrolyte solution, and thus the coating films with higher stability during the storage are formed. FIG. 4 shows the volume variation of the laminate packaging cell over the square root of days of storing. The volumetric variation of the cell in Example 55 is small, as compared with Comparative Examples 7 and 8. It is considered that this is because the coating generated by the decomposition of the compound represented by the general formula (1) is formed on the anode, so that the decomposition of the electrolyte solution or the gas emission due to the decomposition of the electrolyte solution are prohibited.

Example 56

A laminate packaging secondary battery was prepared in the same manner as in Example 55 except that: the electrolyte solution included 0.9 M of $LiPF_6$ as a support salt; the solvent for the electrolyte solution was a mixed solvent of propylene carbonate (PC), ethylene carbonate (EC) and diethyl carbonate (DEC) (volumetric ratio: 20:20:60 (% vol.)); and additionally the compound No. 1 and 1,3-PS were dissolved into the solution at a concentration of the compound in the electrolyte solution of 0.1 M, respectively. The number of the experiences was 3.

As shown in FIG. 2, the capacity recovery rate or the rate of the recovery of the capacity over the square root of the days for storing was significantly improved, as compared with the after-mentioned Comparative Example 7 utilizing a electrolyte solution without any additives and the after-mentioned Comparative Example 8 utilizing a electrolyte solution with 1,3-PS (0.1 M) and VC (0.1M). Further, as shown in FIG. 3, the resistance increase rate over the square root of the days for storing was significantly prohibited, as compared with the after-mentioned Comparative Example 7 utilizing a electrolyte solution without any additives and the after-mentioned Comparative Example 8 utilizing a electrolyte solution with 1,3-PS (0.1 M) and VC (0.1M).

It is considered that these results are obtained because the compounds represented by the general formula (1) of the present invention and 1,3-PS, both of which are added to the electrolyte solution, provides higher ion conductivity as compared with non-additive type electrolyte solution or conventional type electrolyte solution, and thus the coating films with higher stability during the storage are formed.

Also, FIG. 4 shows the volume variation of the laminate packaging cell over the square root of days of storing. The volumetric variation of the cell in Example 56 is small, as compared with Comparative Examples 7 and 8 and Example 55. It is considered that this is because the coating generated due to the combined effect of the compound represented by the general formula (1) and 1,3-PS is formed on the anode, so that the decomposition of the electrolyte solution or the gas emission due to the decomposition of the electrolyte solution are prohibited.

Comparative Example 7

A laminate packaging secondary battery was prepared in the same manner as in Example 55 and evaluation thereof was conducted except that: the electrolyte solution included 0.9 M of $LiPF_6$ as a support salt; the solvent for the electrolyte solution was a mixed solvent of propylene carbonate (PC), ethylene carbonate (EC) and diethyl carbonate (DEC) (volumetric ratio: 20:20:60 (% vol.)); and no additive was added therein. The number of the experiences was 3. The results are shown in FIGS. 2–4.

Comparative Example 8

A laminate packaging secondary battery was prepared in the same manner as in Example 55 and evaluation thereof was conducted except that: the electrolyte solution included 0.9 M of $LiPF_6$ as a support salt; the solvent for the electrolyte solution was a mixed solvent of propylene carbonate (PC), ethylene carbonate (EC) and diethyl carbonate (DEC) (volumetric ratio: 20:20:60 (% vol.)); and additionally 1,3-PS and VC were dissolved into the solution at a concentration of the compound in the electrolyte solution of 0.1 M, respectively. The number of the experiences was 3. The results are shown in FIGS. 2–4.

Example 57

Secondary batteries were prepared in the same manner as in Example 9 except that the compound No. 1 was replaced with the compound No. 21 shown in TABLE-1. The battery properties were examined in the same manner as in Example 9. The capacity retention ratio after 400 cycles was 80.1%. It was confirmed that the battery prepared in Example 57 had improved capacity retention ratio after conducting the cycle tests, i.e., improved cycle properties, as compared with the battery prepared in Comparative Example 4.

Example 58

Secondary batteries were prepared in the same manner as in Example 9 except that the compound No. 1 was replaced with the compound No. 22 shown in TABLE-1. The battery properties were examined in the same manner as in Example 9. The capacity retention ratio after 400 cycles was 83.4%. It was confirmed that the battery prepared in Example 57 had improved capacity retention ratio after conducting the cycle tests, i.e., improved cycle properties, as compared with the battery prepared in Comparative Example 4.

As described above, the efficiency of charging and discharging of the secondary battery is improved by producing the secondary battery employing the electrolyte solution comprising non-proton solvent and cyclic sulfonic ester including at least two sulfonyl groups. Also, the present invention provides the improvement in the cycle properties of the secondary battery. In addition, the present invention provides the prohibition of the increase of the resistance during the storage. Further, since the present invention can be applied in the secondary battery comprising the laminate film packaging so that the increase of the resistance, the blistering of the battery itself and the emission of gases can be prohibited, the secondary battery according to the present invention is suitably applicable in the lithium ion secondary battery for the larger sized applications such as automotive applications.

What is claimed is:

1. An electrolyte solution for a secondary battery, comprising non-proton solvent and cyclic sulfonic ester including at least two sulfonyl groups.

2. The electrolyte solution for a secondary battery according to claim 1, wherein said cyclic sulfonic ester is a compound represented by a general formula (1) described below:

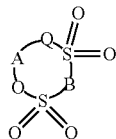

(1)

(where: Q is oxygen atom, methylene group or single bond; A is substituted or non-substituted alkylene group containing 1 to 5 carbons, carbonyl group, sulfinyl group, substituted or non-substituted fluoroalkylene group containing 1 to 6 carbons or divalent group containing 2 to 6 carbons being bonded to alkylene unit or fluoroalkylene unit via ether bond; and B is substituted or non-substituted alkylene group, substituted or non-substituted fluoroalkylene group or oxygen atom).

3. The electrolyte solution for the secondary battery according to claim 2, wherein said compound represented by a general formula (1) is cyclic disulfonic ester represented by the following general formula (2):

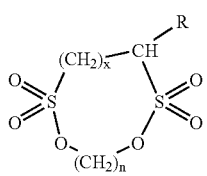

(2)

(where: x is 0 or 1; n is an integer from 1 to 5; and R is hydrogen atom, methyl group, ethyl group or halogen atom).

4. The electrolyte solution for the secondary battery according to claim 2, wherein said compound represented by a general formula (1) is cyclic disulfonic ester represented by the following general formula (3):

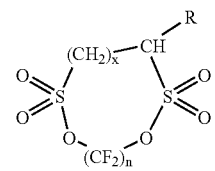

(3)

(where: x is 0 or 1; n is an integer from 1 to 5; and R is hydrogen atom, methyl group, ethyl group or halogen atom).

5. The electrolyte solution for the secondary battery according to claim 2, wherein said compound represented by a general formula (1) is cyclic disulfonic ester represented by the following general formula (4):

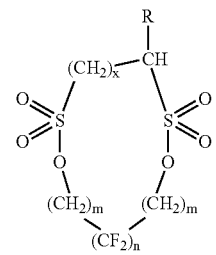

(4)

(where: x is 0 or 1; m is 1 or 2; n is an integer from 1 to 4; and R is hydrogen atom, methyl group, ethyl group or halogen atom).

6. The electrolyte solution for the secondary battery according to claim 2, wherein said compound represented by a general formula (1) is cyclic disulfonic ester represented by the following general formula (5):

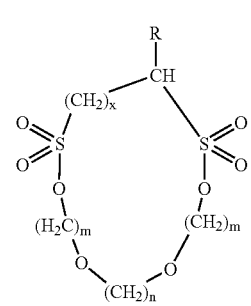

(5)

(where: x is 0 or 1; m is 1 or 2; n is an integer from 1 to 4; and R is hydrogen atom, methyl group, ethyl group or halogen atom).

7. The electrolyte solution for the secondary battery according to claim 2, wherein said compound represented by a general formula (1) is cyclic disulfonic ester represented by the following general formula (6):

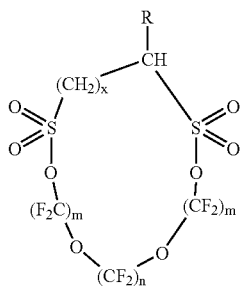

(6)

(where: x is 0 or 1; m is 1 or 2; n is an integer from 1 to 4; and R is hydrogen atom, methyl group, ethyl group or halogen atom).

8. The electrolyte solution for the secondary battery according to claim 2, wherein said compound represented by a general formula (1) is cyclic disulfonic ester represented by the following general formula (7):

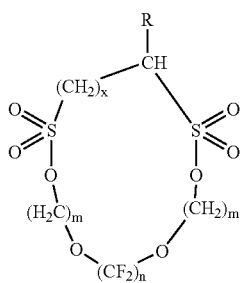

(7)

(where: x is 0 or 1; m is 1 or 2; n is an integer from 1 to 4; and R is hydrogen atom, methyl group, ethyl group or halogen atom).

9. The electrolyte solution for the secondary battery according to claim 1, further comprising a compound having at least one sulfonyl group, in addition to said cyclic sulfonic ester.

10. The electrolyte solution for the secondary battery according to claim 9, wherein said compound having at least one sulfonyl group is included at a weight ratio over said cyclic sulfonic ester of 0.01 to 100.

11. The electrolyte solution for the secondary battery according to claim 9, wherein said compound having at least one sulfonyl group is a compound represented by the following general formula (8):

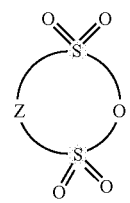

(8)

(where: Z is substituted or non-substituted alkylene group containing 2 to 4 carbons, substituted or non-substituted alkenylene group containing 2 to 4 carbons, substituted or non-substituted aromatic cyclic group or substituted or non-substituted hetero cyclic group).

12. The electrolyte solution for the secondary battery according to claim 9, wherein said compound having at least one sulfonyl group is a sultone compound represented by the following general formula (9):

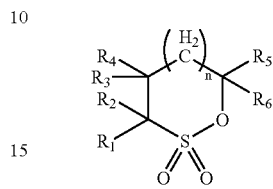

(9)

(where: n is an integer from 0 to 2; and $R_1$ to $R_6$ is separately selected from the group consisting of hydrogen atom, alkyl group containing 1 to 12 carbons, cycloalkyl group containing 3 to 6 carbons and aryl group containing 6 to 12 carbons).

13. The electrolyte solution for the secondary battery according to claim 1, further comprising imide anion and transition metal ion.

14. The electrolyte solution for the secondary battery according to claim 13, wherein said transition metal ion is lanthanoid transition metal ion.

15. The electrolyte solution for the secondary battery according to claim 14, wherein said lanthanoid transition metal ion is selected from the group consisting of: europium ion; neodymium ion; erbium ion; and holmium ion.

16. The electrolyte solution for the secondary battery according to claim 13, wherein said imide anion is represented by $^-N(C_nF_{2n+1}SO_2)(C_mF_{2m+1}SO_2)$ (where each of n and m is independently an integer of 1 to 6).

17. The electrolyte solution for the secondary battery according to claim 13, wherein said imide anion or metal complex thereof is included in said electrolyte solution at a concentration of 0.005% wt. to 10% wt.

18. The electrolyte solution for the secondary battery according to claim 1, further comprising metal complex of imide anion and transition metal ion.

19. The electrolyte solution for the secondary battery according to claim 1, wherein said cyclic sulfonic ester is included in said electrolyte solution at a concentration of 0.005% wt. to 10% wt.

20. The electrolyte solution for the secondary battery according to claim 1, further comprising vinylene carbonate or derivatives thereof.

21. The electrolyte solution for the secondary battery according to claim 1, wherein said non-proton solvent includes one or more solvent(s) selected from the group consisting of: cyclic carbonates; linear carbonates; aliphatic carboxylic acid esters; γ-lactones; cyclic ethers; linear ethers; and fluoro-derivatives thereof.

22. The electrolyte solution for the secondary battery according to claim 1, further comprising lithium salt(s), which is one or more compound(s) selected from the group consisting of: $LiPF_6$; $LiBF_4$; $LiAsF_6$; $LiSbF_6$; $LiClO_4$; $LiAlCl_4$; and $LiN(C_nF_{2n+1}SO_2)(C_mF_{2m+1}SO_2)$ (where: n and m are integer numbers).

23. A secondary battery comprising at least a cathode and an anode, said secondary battery including the electrolyte solution according to claim 1.

24. The secondary battery according to claim 23, further comprising a cathode active material of lithium-containing combined oxide.

25. The secondary battery according to claim 23, further comprising an anode active material of one or more material(s) selected from the group consisting of: a material being capable of intercalating and deintercalating lithium; a metallic lithium; a lithium alloy; and a metal material being capable of forming an alloy with lithium.

26. The secondary battery according to claim 25, wherein said anode active material contains a carbon material.

27. The secondary battery according to claim 26, wherein said carbon material is graphite.

28. The secondary battery according to claim 26, wherein said carbon material is amorphous carbon.

29. The secondary battery according to claim 23, further comprising a film packaging.

* * * * *